May 29, 1962 A. WIRTH 3,036,648
WEIGHING APPARATUS
Filed March 3, 1959 3 Sheets-Sheet 1
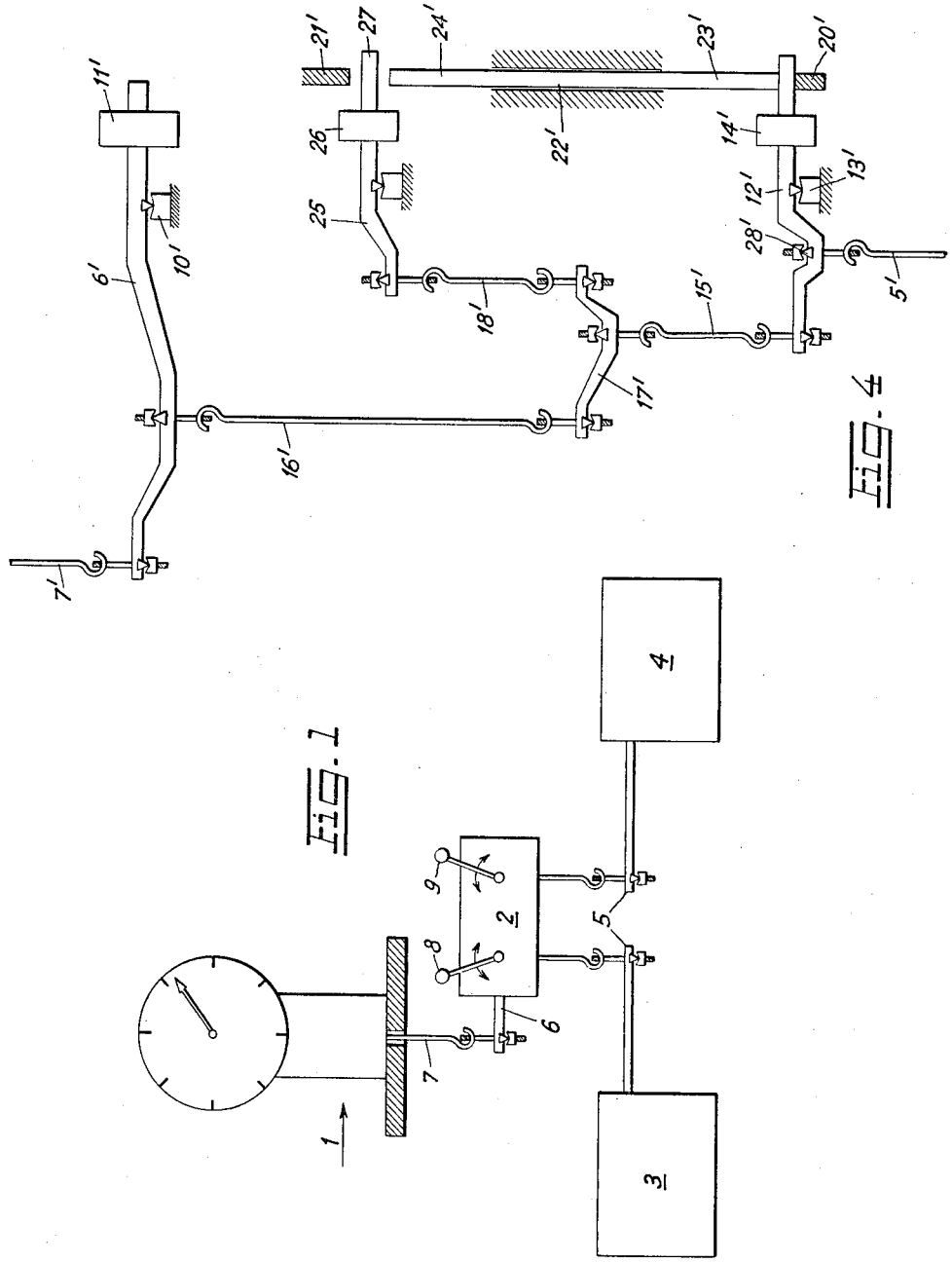
INVENTOR
ARMIN WIRTH
BY *Imirie and Smiley*
ATTORNEYS

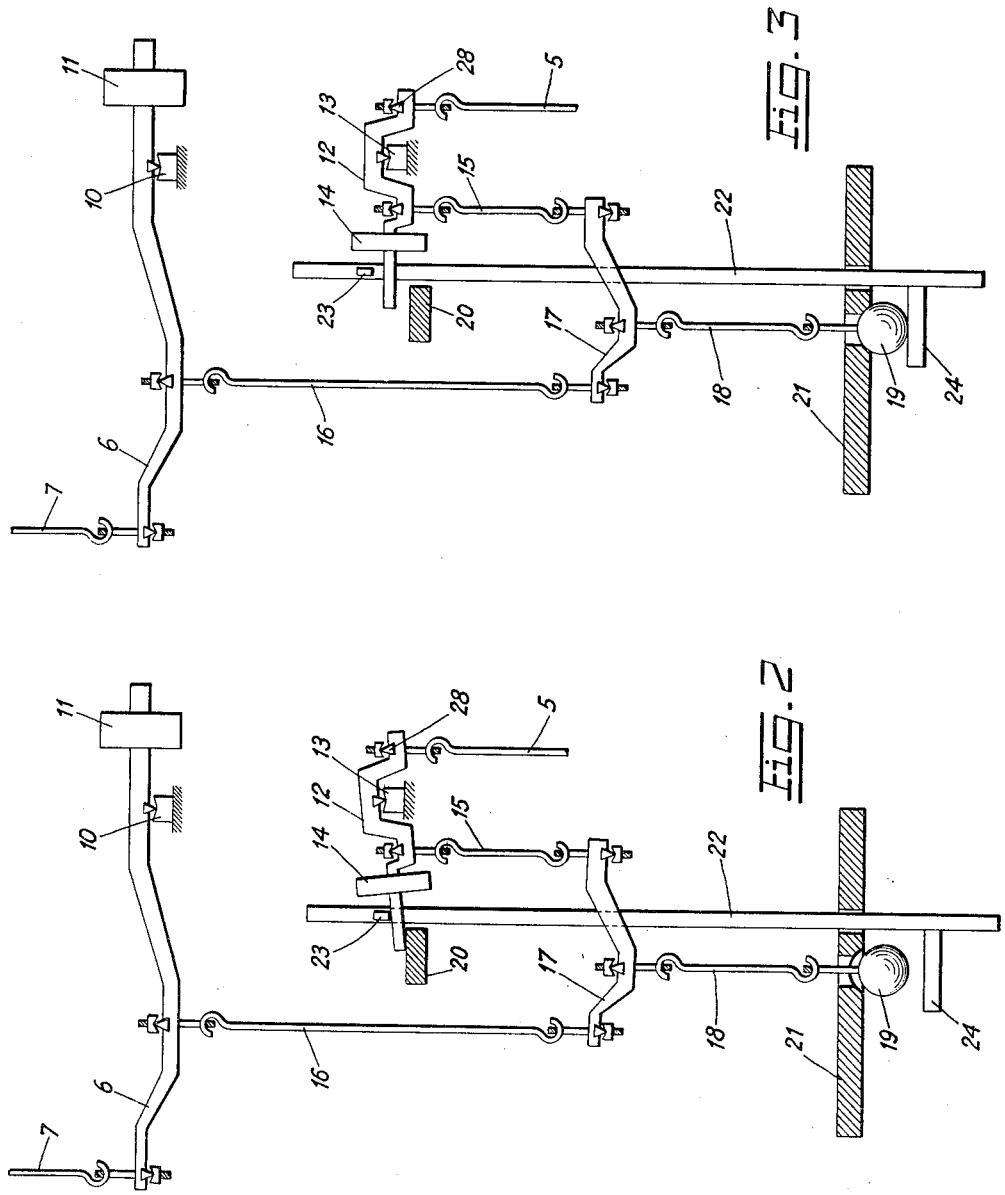

May 29, 1962 A. WIRTH 3,036,648
WEIGHING APPARATUS
Filed March 3, 1959 3 Sheets-Sheet 3
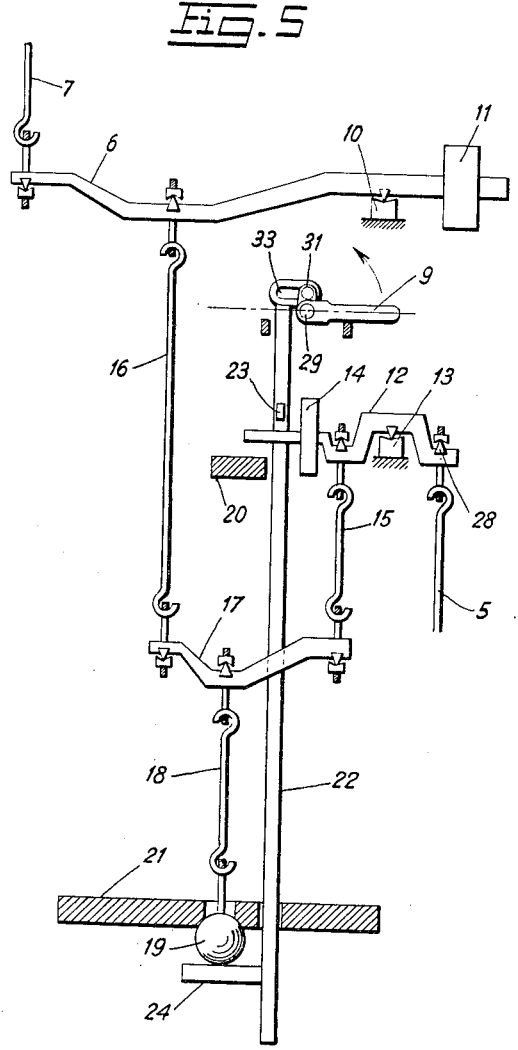
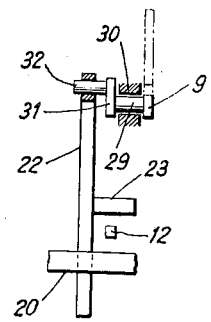
INVENTOR
ARMIN WIRTH

United States Patent Office 3,036,648
Patented May 29, 1962

3,036,648
WEIGHING APPARATUS
Armin Wirth, Sonnenbergstr. 55, Zurich, Switzerland
Filed Mar. 3, 1959, Ser. No. 796,947
Claims priority, application Switzerland Mar. 7, 1958
1 Claim. (Cl. 177—199)

The present invention relates to a linkage for coupling at least one weighing machine with a single indicating device. The solution of the problem of weighing on more than one scale or weighbridge with the help of only one indicating device calls for the provision of a system which will permit the loads transmitted by the lever linkages of the weighbridges to be applied to or withheld from the indicating device as required. Inter alia such linkages must satisfy the condition of not affecting the zero position of the indicating device when either the one or the other weighing machine or both together are coupled with or uncoupled from the indicating device. The most usual method of doing this in the past has been to compensate the disturbance in the equilibrium of the indicating device when one scale or weighbridge was disconnected by applying a suitable counterweight. Apart from the unavoidable shocks which arise in changeover, the system works tolerably well when under cover of a roof if the change-over is not too roughly performed. However, in the case of weighbridges installed in the open the process of maintaining equilibrium is a nuisance because it is cumbersome. When the weight of the weighbridge changes owing to rain, snow, dirt, and so forth, the compensating weight should likewise be changed. As this is not readily possible, the process of re-balancing is a complicated procedure which must be performed in stages in a prescribed sequence of operations. Moreover, raising the knife-edges and suspensions, as is generally conventional, increases their wear.

The linkage proposed by the present invention overcomes these drawbacks by including a lever with a sliding poise for zeroising the scale, said lever co-operating with a subsidiary lever loaded by a compensating weight, means being provided to arrest the first lever and thereby to inactivate the weighing machine.

Two embodiments of the subject matter of the invention are diagrammatically shown in the accompanying drawings in which:

FIG. 1 shows the general arrangement of a linkage comprising two weighbridges and one indicating device,
FIG. 2 is a first embodiment in operative position and
FIG. 3 is the same embodiment in inactivated position.
FIG. 4 is a second embodiment in inactivated position.
FIGS. 5 and 6 show the means by which the platforms are connected and/or disconnected.

With reference now to FIG. 1, the indicating device is generally shown at 1; 2 generally indicates the coupling linkage, and 3 and 4 each indicate a weighbridge or load platform, for instance for weighing railroad trucks. The loads on the weighbridges 3 and 4 are each transmitted through a respective link 5 and the linkage 2 to the common weigh-beam 6 of linkage 2 in a manner that will be hereafter described, said weigh-beam transmitting its deflections to the indicating device 1 through a further link. Hand levers, 8, 9 permit either the one or the other or both weighbridges 3 and 4 to be brought into operation or into relief as may be required.

FIGS. 2 and 3 illustrate one embodiment of the linkage comprised in unit 2. The aforementioned weigh-beam 6 pivots on a stationary fulcrum 10 and carries an adjustable poise 11 and a hanging link 16. Link 5 transmits the load to one end of a first lever 12, hereafter referred to as the "balancing lever," which likewise pivots on a fixed fulcrum 13 and carries an adjustable poise 14.

This balancing lever 12 likewise carries a hanging link 15. A second or subsidiary lever 17 is suspended between the two links 15 and 16. This lever also carries a hanging link 18 which carries a weight 19. Moreover, a first abutment 20 is provided under the free end 12a of balancing lever 12. A sliding bar 22 operable by one of the two levers 8 and 9 is formed with two abutments 23 and 24 in such manner that according to the position of the sliding bar 22 either the end 12a of the balancing lever 12 can be arrested between the abutments 20 and 23 or the weight 19 can be locked between an abutment 21 and the abutment 24. For the sake of simplicity only one such relieving linkage is shown, although it will be understood that as many links 16 as there are weighbridges will be provided. They may be suspended either from several knife-edges on the weigh-beam 6 or from a single wide knife-edge.

As shown in FIGS. 5 and 6, the lever 9 is fixed on a pivot 29 rotatably mounted in a part 30 of the frame of the apparatus. At the other end of pivot 29, a crank lever 31 is fixed, the arm 32 of which enters a slot 33 of the upper end of sliding bar 22. When the lever 9 is rotated counterclockwise, arrow FIG. 5, to the dotted line position in FIG. 6, the sliding bar 22 is in the position of FIG. 2 and the corresponding platform is disconnected. When the lever 9 is in the position of FIG. 5, the sliding bar 22 is in the position of FIG. 3 and the platform is connected. Lever 8 operates in the same manner as lever 9.

In FIG. 2 the balancing lever 12 is shown in arrested position between abutments 20 and 23. The corresponding weighbridge is thus in relief. The load transmitted to the link 16 is therefore a constant, provided there is no contact between the spherical weight 19 and abutment 21, a requirement which can be readily met by the suitable choice of the available play.

FIG. 3 shows the linkage in operative position. The sliding bar 22 has been raised to release the free end 12a of lever 12 which now ceases to be arrested between the two abutments 20 and 23, whereas the weight 19 is locked between the two abutments 21 and 24.

The load on link 5 will now be transmitted through the balancing lever 12, links 15 and 16 through lever 17, which reverses the direction of motion, to weigh-beam 6. Link 18 is now likewise under load because the weight 19 does not freely depend therefrom.

Assuming the weighbridge is empty, the load component in link 18 will be exactly equal to that represented by weight 19, so that when the empty weighbridge is activated, the pressure of this weight bearing against abutment 21 would be exactly nil, were it not for the fact that the weight is arrested by abutment 24. The reason for this clamping this weight is that the neutral equilibrium which is established between the weight and the weighbridge would lead to a tendency of the weight chattering if it were loose.

The installation is now zeroised in the following manner:

(a) All the weighbridges are relieved;
(b) The indicating device is zeroised by adjusting poise 11, assuming the indicating device is not itself fitted with zeroising means;
(c) Weighbridge 4 is activated and poise 14 adjusted until the indicating device again reads zero.
(d) Weighbridge 4 is then relieved and bridge 2 activated.
(e) Operation (c) is repeated for bridge 2.

If changes in equilibrium occur as a result of rain, snow, dirt and the like, and the indicating device fails to read zero when the bridge is empty, equilibrium is re-established by re-adjustment of poise 14. The counterpoise 19 need never be touched. This may therefore be under lock and key inside the control box and remain in zero equilibrium with the indicating device. This process of zeroisation is substantially simpler than that hitherto practised.

FIG. 4 illustrates a second embodiment of the invention showing the associated weighbridge inactivated. Analogous components are indicated by like reference numerals with index '.

The load transmitted through link 5' is applied to the balancing lever 12' which is shown arrested between abutments 20' and 23'. The associated weighbridge is therefore in relief. The arrested lever 12' is connected with a lever 17' through a link suspension 15', lever 17' being itself suspended between a suspension link 16' hanging from common weigh-beam 6' and a suspension link 18' hanging from one end of a lever 25 which carries a counterpoise 26. This counterpoise corresponds with counterweight 19 in FIGS. 2 and 3. In the illustrated position the free end 27 of lever 25 is free to swing between abutments 21' and 24'. So long as this lever does not strike these abutments the load transmitted through link 18' will be constant, i.e., independent of the position of lever 25 throughout its deflection range. Consequently the load transmitted to the indicating device will likewise be constant, as is required when the associated weighbridge is in relief. The indicating device is therefore free to be deflected, for instance by a load on the other weighbridges, the two levers 17' and 25 being merely deflected in idle motion.

When the associated weighbridge is activated the end 27 of lever 25 is arrested between abutments 21' and 24', whereas the right hand end (FIG. 4) of lever 12' is released. The load in link 18' will now cease to be constant, since the load transmitted through link 5', or a component thereof, will add thereto and be transmitted to suspension link 16'.

In both described embodiments the abutments may naturally be arranged to arrest the links 5 to 5' or 15 or 15' instead of lever 12 or 12'. It would even be possible to arrest any other of the levers in the transmission line between lever 12 or 12' and the weighbridge. However, provision must always be made to ensure that when the weighbridge is in relief the knife-edge 28 or 28' on lever 12 or 12' associated with link 5 or 5' is fixed and unable to yield to vertical loads.

The balancing levers 12, 12' must be so contrived that at least any accidental change in the balance of the bridge can be compensated, because only then will it be possible without unlocking the control box to re-establish zero on the indicating device. It is in any event preferable to support as large a proportion as possible of the dead weight from this balancing lever because reduced loads transmitted through members 15, 17, 18 or 15', 17', 18' will correspondingly reduce the effort required for effecting the desired change-over.

On the other hand, the loads transmitted through these members should still be sufficient to avoid fulcra and knife-edges from being completely relieved by vibrations of the weighing machine and from thus causing undesirable jolts. This can be achieved by suitably selecting the compensating weights.

The balancing lever 12 or 12' may incidentally also be used to make operational tare adjustments. For instance if certain goods are always weighed in the same container or on the same truck (or several trucks of equal weight), then the lever may be provided with a tare adjusting weight to permit net weights to be directly weighed. Nevertheless operational tare allowances are preferably made by adjustments on the common lever 6 or 6'.

I claim:

Weighing apparatus comprising at least two load platforms, a weighing machine including a weigh beam, an indicating device, a load-counterbalancing mechanism coupled to said indicating device, a lever linkage connected for transmitting loads on said load platforms to said weigh beam and a linkage between said weigh beam and said indicating device for transmitting movements of said weigh beam to said indicating device, auxiliary constant counterweights corresponding to the weight of the load platforms under no-load conditions, and means for selectively preventing the transmission of the load on a load platform to said weigh beam, wherein said lever linkage comprises for each load platform an intermediate lever with three knife-edges, a second lever with an adjustable poise, a linkage between one of said knife-edges and said second lever, a linkage between said second lever and the load platform, a linkage between another of said knife-edges and the weigh beam, a linkage between the remaining knife-edge and said auxiliary counterweight, said means for selectively preventing load transmission comprising a locking device for locking said remaining knife-edge loaded by said auxiliary compensating counterweight for connecting the corresponding load platform, said second lever being free to rock together with said intermediate lever, said locking device locking said second lever for disconnecting the corresponding load platform, said remaining knife-edge being then loaded by said auxiliary compensating weight which exerts a pull on the weigh beam corresponding to the weight of said corresponding load platform when connected and being under no-load conditions.

References Cited in the file of this patent
UNITED STATES PATENTS

| | | |
|---|---|---|
| 928,658 | Hoyt | July 20, 1909 |
| 1,667,894 | Hem | May 1, 1928 |
| 1,780,411 | Ulrich | Nov. 4, 1930 |
| 2,157,577 | Schroeder | May 9, 1939 |